Figure 2:
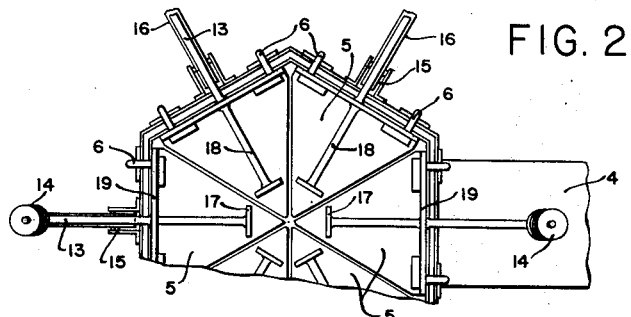

Nov. 9, 1954  A. J. GRINDLE  2,693,886
APPARATUS FOR LOADING CUPOLAS
Filed March 5, 1952

INVENTOR:
AUBREY J. GRINDLE
BY:
Philip J. Liggett
ATTORNEY:

United States Patent Office 2,693,886
Patented Nov. 9, 1954

2,693,886

APPARATUS FOR LOADING CUPOLAS

Aubrey J. Grindle, Harvey, Ill., assignor to Grindle Corporation, Markham, Ill., a corporation of Illinois Application March 5, 1952, Serial No. 274,998

7 Claims. (Cl. 214—18)

This invention relates to an improved apparatus for effecting the top loading of closed top cupolas, vertical furnaces, or other like types of heating chambers. More specifically, this improvement is directed to both the operation and the integrated design of the top portion of a cupola in conjunction with a loading bucket therefore, such that a closed cupola is provided and so that charge materials may be properly distributed into the cupola, while hot combustion gases and entrained material are substantially prevented from escaping directly to the atmosphere.

In order to prevent the escape of obnoxious and injurious smokes, fumes, and silica dust, or other particles, directly to the atmosphere, it is desirable to provide a top closure to a cupola stack and to pass the combustion gases and entrained material through purifying apparatus prior to discharge into the air. However, the mechanical charging of cupolas is usually made through open doors in the side thereof and air readily enters the stack or upper portion of the cupola to become admixed with the oxidation and combustion gases rising from the lower portion of the cupola. This means that in effecting the cleaning and purification of the resulting combustion gases that a large volume of gases must be handled in the purifying equipment. Thus, in order to prevent excess air from entering the upper portion of the cupola and minimize the quantity of gas which must be handled in cleaning or purifying equipment, it is desirable to provide an entirely closed cupola design and to effect the mechanical loading through some type of movable door arrangement.

The open door type of cupola is also of disadvantage in permitting air to be present immediately after the loading operation so that carbon monoxide present in the combustion gases is oxidized to carbon dioxide with a resulting increase in temperature within the upper portion of the cupola. Thus, additional cooling of the combustion gas stream passing to the cleaning and dust removal section must be effected to reduce the temperature. Generally, the gas temperature passing to the filtering section of the gas cleaning and purifying equipment cannot be more than about 600° F. where spun glass type of filters are utilized. If cloth filters, cotton filters, and the like are utilized, still lower temperatures must be provided for the gaseous stream entering the filtering zone. After the loading period, the temperature in the upper portion of the cupola may of course rise to temperatures which are excessive for the cleaning operation and it is thus within the scope of the present improvement to include water-spray apparatus within the upper portion of the cupola or within the gas outlet duct connecting therewith, so as to provide for the reduction of temperature of the gaseous stream. However, in any case it is desirable to hold the gas temperature low and to minimize the amount of water which is introduced into the stream and prevent excessive moisture traveling to the filtering section of the purification apparatus, where water would unduly wet and agglomerate the entrained particles being collected on the filter mediums.

It is to be further noted that the present types of loading methods and charging equipment used in connection with present types of cupolas do not effect a proper loading of the charge material to the top of the bed which is maintained within the cupola. One common type of charging bucket has a removable cone-bottom section which permits all of the charge material to fall to the outer periphery of the bed, around the inside wall of the cupola. Generally, as found in iron melting cupolas, it is desirable to have the coke and pig iron or scrap iron distributed to the outer periphery of the bed so as to maintain a so-called "soft portion" at the center of the bed. However, it is highly desirable and preferable in some instances to obtain a more uniform distribution of a portion of the charge material. For example, in effecting the loading of a cupola for melting pig iron, it is preferable to add the limestone flux material uniformly across the entire cross-sectional area of the cupola, rather than around the edge thereof, together with the pig iron and coke charge.

One principal object of the present invention is to provide an improved means for effecting the loading of a cupola from the top thereof so as to preclude the necessity of an open side door for a charging bucket, and in turn prevent the passage of a large quantity of air into the upper portion of the cupola and into admixture with combustion gases so as to cause the cleaning and purifying equipment to be unnecessarily over-loaded.

It is another object of the present invention to provide an improved means for effecting the loading of a closed cupola from the top thereof, so as to prevent the discharge of undesirable gases and entrained material to the atmosphere.

It is a further object of the present invention to provide an improved integrated design and operation for both the top closure of a cupola and loading or charging bucket therefore, so that at least a portion of the charge material may be received separately and distributed uniformly across the entire bed of material maintained in the cupola.

It is still another object of the present invention to provide a segmental type of top closure on the cupola which permits its opening by being contacted and pushed open by the cupola charge bucket, and further to provide ribs on top of the segmental sections of the closure which effect the discharge of a particular portion of the cupola charge material from a specially operating charging bucket onto the upper surface of the closure section, whereby the particular portion of charge material may be subsequently uniformly distributed into the cupola proper as the charge bucket pushes down through the closure section.

Other objects and advantages of the present invention will be apparent in connection with succeeding portions of the specification relating to the description of the invention.

In a broad aspect, the present improved invention provides means for effecting the top loading of a closed cupola, while substantially preventing the escape of combustion gases therefrom, in a manner which comprises, maintaining a plurality of closely abutting and swinging top closure sections across the top of said cupola, dropping a charging bucket with charge material over the closure sections and effecting the pivoting and opening thereof, continuing the downward passage of the charge bucket through the top of the cupola and bringing an upper outwardly projecting portion of the bucket into contact with an entirely circumferential supporting means at the top of the cupola and thereby preventing the escape of combustion gases therefrom, lowering a bottom portion of the charging bucket and distributing charge material into the cupola, subsequently pulling the bottom portion of said bucket into place and lifting the bucket from said cupola top while permitting the swinging segmental portions of the top closure of the cupola to close the cupola with substantially no escape of gas therefrom.

It is not intended to limit the present improved apparatus and method of loading to any one particular type of cupola, for the means may well be utilized for cupolas handling ferrous as well as non-ferrous metals, such as brass, etc., or alternatively, for rock-wool producing cupolas which receive a charge of slag and rock. As noted hereinbefore, in connection with foundry cupolas for the melting of pig iron, it is desirable to introduce a portion of the charge material, in particular the limestone fluxing agent, across the entire bed maintained in the cupola rather than around the edge thereof, such as provided by the usual type of cone-shaped drop bottom form of charging bucket. The principal reason for desiring to keep the flux, such as limestone, away from the wall of the cupola is that it fluxes the minerals in the refractory liner of the wall and effects its rapid breakdown. Also, in connection with the present broad improvement it is not intended to limit the method of loading, or the apparatus, to the use of any one type of charging bucket for the usual cone-bottom bucket may be utilized, or alternatively, the single or double-leaf drop bottom buckets may be used.

Thus, in connection with a more specific embodiment of the present invention, where it is desired to effect the top loading of a closed cupola and obtain the uniform distribution of a selected portion of the charge material, while substantially preventing the escape of combustion gases therefrom, the improvement comprises, effecting the filling of a center portion of a segmentally divided top closure on cupola with the selected portion of the charge material therefore, dropping a charging bucket with additional charge material downwardly through the top closure and pivoting and pushing the segmental portions thereof inwardly in a manner effecting the spilling of the selected portion of charge material substantially uniformly across the cupola, continuing the downward movement of the bucket and bringing an upper outwardly projecting portion thereof into contact with a resulting entirely circumferential support or resting means at the top of the cupola and thereby preventing the escape of combustion gases, subsequently lowering the bottom portion of the charge bucket and distributing additional portion of charge material into the cupola around the periphery thereof, subsequently pulling the bottom portion of the bucket into place and lifting the bucket from the cupola while providing that the segmental portions of the top closure of the cupola follow the bucket upward and thereby close the cupola with substantially no escape of gas therefrom.

The improved apparatus for effecting the top loading of a closed cupola may be better explained and described in connection with the accompanying drawing and the following description thereof.

Figure 1:
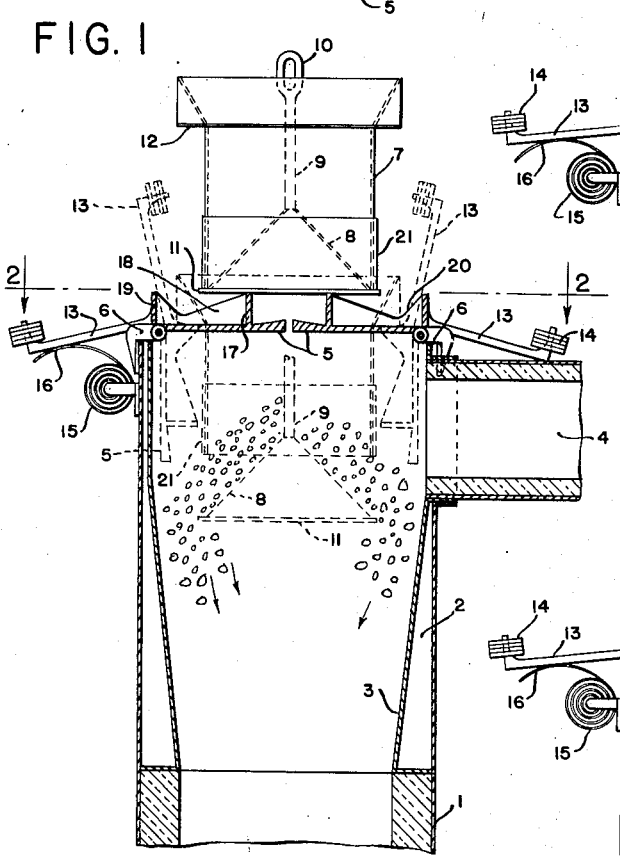

Figure 1 of the drawing is a sectional elevational view of the upper portion of a cupola having a movable top closure adapted to receive a charging bucket.

Figure 2 of the drawing indicates a partial plan view of the special type of segmental top closure for a cupola, as indicated by the line 2—2 in Figure 1 of the drawing.

Figure 3:
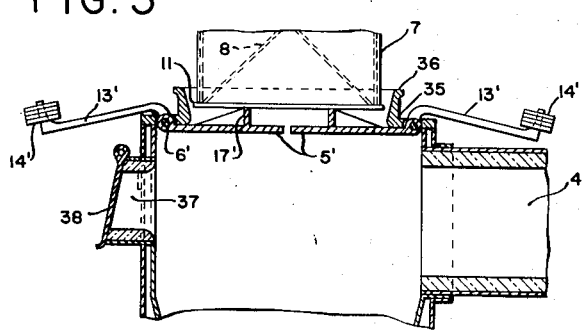

Figure 3 of the drawing shows an alternative construction for the top portion of cupola and the segmental closure sections therefore.

Figure 4:
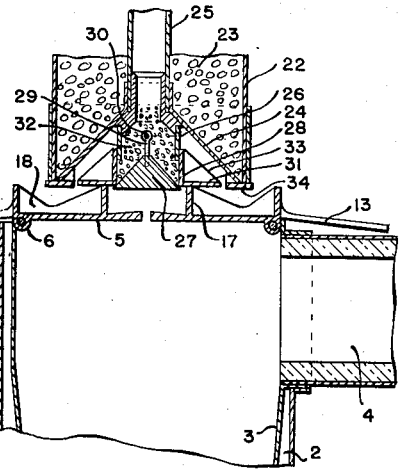
Figure 5:
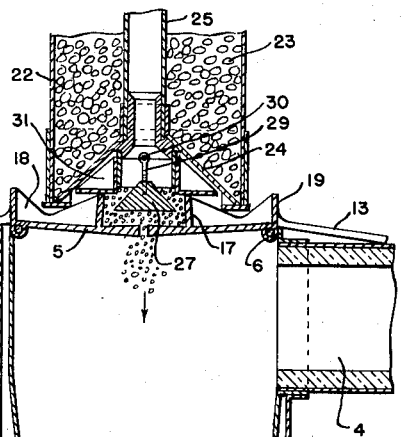

Figures 4 and 5 of the drawing indicate an improved type of charging bucket having a special compartment within the lower drop cone portion thereof, and means cooperating with the ribs on top of the closure of the cupola for effecting the discharge of a selected portion of the charge material onto the top of the closure.

Referring now to Figures 1 and 2 of the drawing, there is shown the upper portion of a vertical refractory lined cupola 1, and an upper top loading section 2, the latter extending above the refractory lined portion of the cupola. The particular upper section 2, that is indicated in the present drawing, terminates in a hexagonal shape, however, this portion may be octagonal or of any other polygonal shape, or alternatively, may be substantially circular. The internal surface of the upper loading portion 2 is preferably lined with cast or steel plate liner 3 so as to better withstand the impact and wear from the charge material dropped into the cupola. Smoke and fumes and entrained dust particles leave the upper portion of the cupola by way of the gas outlet duct 4. As noted hereinbefore, a closed top cupola, such as provided by the present invention, is utilized in connection with cupola installations having smoke and fume cleaning and purifying apparatus in connection therewith. Thus, the smoke and fumes passing by way of duct 4 lead to purifying and dust collecting apparatus, or if permitted to burn, the gases may be passed to heat exchange apparatus, so that the hot combustion gases may give up their heat to other gaseous or liquid streams which may be utilized in connection with the cupola apparatus.

The present embodiment has a top closure on the cupola loading section 2 which comprises a plurality of closely abutting segmental and pivoting closure plates 5. Each closure section 5 in turn has a pair of hinges 6 or other suitable hinging means so that each section is inwardly swinging and may be pushed downwardly by a charging or loading bucket, such as 7. Figure 1 of the drawing indicates diagrammatically a typical loading bucket having a drop cone bottom 8. The cone 8 connects with a central stem or shaft 9 which in turn has lifting eye 10, in order that the bucket may be connected with a crane or suitable hoisting apparatus. The lower rim or edge of the drop-bottom cone 8 is provided with a horizontal flange or rim section 11 which in turn suitably supports the body section of the loading bucket 7 and the charge material is maintained above the cone bottom 8 and within the body section of the bucket 7. In order that the loading and charge bucket may come to rest, as will be explained more fully hereinafter, the upper portion of the loading bucket 7 is provided with an outwardly extending rim or flange member 12.

Referring again to the construction and operation of the plurality of closure sections 5, it is to be noted that each section has a suitable counter-weight arm 13, which in turn is adapted to hold one or more suitable counterweight pieces 14. Connecting with the side of the upper portion of the cupola 2, at each closure section 5, are coiled compression springs 15, each one adapted to come in contact with a counter-weight arm 13 of each closure section. As indicated, an outwardly projecting end section 16 of each compression spring 15 contacts the arm 13 and holds each closure section 5 in a normal substantially horizontal position across the top of the cupola. When there is a puff or explosion within the cupola, and the door or sections 5 must operate as an explosion door, each section 5 is thrust upwardly and the counter-weight arms 13 compress against the ends 16 of each compression spring 15. After the thrust of the explosion, the spring members 15 act to push each closure section 5 back to a normal horizontal position. During the reverse operation, where the loading bucket 7 pushes the closure sections 5 downwardly and inwardly, the counter-weight arms 13 raise off of the spring ends 16 for the period of the loading. However, as the loading bucket 7 is withdrawn from the cupola the counterweights 14 acting on arms 13 cause each door or closure section 5 to follow the bucket upwardly and return to a normal horizontal position, with counter-weight arms 13 resting on ends 16 of the closure springs 15.

In accordance with the present improved construction and operation, where the loading is effected without substantial loss of gases through the top of the cupola, it is to be noted that each of the closure sections 5 is provided with an inner or intermediate rib section 17, a longitudinal or radial rib 18 and an outer transverse or peripheral rib 19. Each of the radial ribs 18 are specially formed to provide a slanting and curved vertical profile, indicated by the edge 20, so that the lower edge of the loading bucket 7 has a slanting or curved contact surface permitting the closure section 5 to be pushed downwardly without being caught, or alternatively, to follow the end of the bucket upwardly upon the latter being withdrawn, and not become caught within the edge of the bucket.

The outer vertically projecting peripheral ribs 19 furnish a supporting flange for the outwardly projecting rib or flange 12 below the bucket after each closure section 5 is swung downwardly and inwardly to a substantially vertical position, in which case the vertical ribs 19 become substantially inwardly projecting horizontal ribs. The top edge of rib 19 may be substantially horizontal, or alternatively may be curved concavely inwardly, so that as each closure section 5 is pushed downwardly and inwardly to a vertical position by the bucket 7, each of the ribs 19 form, in a horizontal position, a substantially complete circular ledge suitable for supporting the bucket 7 on its flange 12.

The improved loading operation is thus as follows, a loaded charge bucket, such as 7, is brought over the top of the closure of the cupola by a suitable crane or hoisting means, and is slowly dropped over a center portion of the cupola until the lower edge of the bucket 7 at cone support flange 11 comes into contact with the vertical ribs 18 on the closure members 5 at the top of the cupola. It is to be noted that the sloping surfaces on each rib 18 will tend to aid in centering the bucket over the middle of the cupola, so that the lower edge or support rim 11 will tend to push each closure section 5 downwardly substantially at the same time. The charging bucket 7 continues a slow downward movement into the top of the cupola pushing each door section 5 downwardly and inwardly, swinging on their respective pivoting means 6, whereby each section 5 assumes a substantially vertical position within the cupola, against the liner 3 on the inside wall of the upper section 2. Just prior to the time that the outwardly projecting flange 12 of the loading bucket 7 reaches the top level of the upper edge of the cupola, each of the peripheral ribs 19 of the closure section will have rotated 90° into a substantially horizontal position providing a shelf-like supporting ledge around the inside periphery of the cupola. Thus, the flange 12 comes to rest on the plurality of ribs 19 and the downward travel of the main body portion of the bucket 7 is stopped. However, the crane or hoisting means continues to lower the stem 9 and the cone bottom 8 of the loading bucket, downwardly and away from the lower edge of the body portion of the bucket 7 so that the charge material supported in the bucket above the surface of the cone 8 is allowed to fall into the interior of the cupola. The dotted outline within Figure 1 of the drawing, indicates the closure sections 5 rotated into a vertical position and the loading bucket 7 discharging the charge material peripherally around the inside of the cupola, with the material falling in the direction of the dashed-arrows.

After the charge material has been allowed to fall from the loading bucket, the hoisting apparatus lifts upwardly on the hook or eye 10 and stem 9 pulling the cone bottom 8 and its outwardly projecting flange or rim 11 into contact with the lower edge of the body section of the charge bucket 7. The bucket can then be raised slowly from the top of the cupola and the counter weight means 13 and 14 on each closure section 5 causes each of the sections to come into contact with the outer surface of the loading bucket 7, particularly the outer reinforcing section 21, and as the bucket continues upwardly each closure section 5 follows the bucket along the contact surface 20 on radial rib 18. Then, as the loading bucket 7 leaves the top of the cupola, each closure section 5 assumes a normal horizontal position closing the top of the cupola and each counter-weight arm 13 comes into contact with the end 16 of each compression spring 15. It is to be noted that each compression spring 15 is preferably provided with suitable adjustment means so that it may in turn preferably hold each closure section 5 in a substantially horizontal position through contact with the arms 13.

In Figure 3 of the drawing an alternative modification of the segmental closure arrangement is shown. There are a plurality of closely abutting and downwardly swinging sections 5', each of which has a counterweight arm 13' connecting thereto at a hinge zone 6', and these sections 5' are adapted to swing downwardly by the lowering and pushing of the end of the charge bucket 7. However, in this instance a fixed supporting member 35 circumscribes the top of the cupola and has an upturned circular flange section 36 which in turn has a flat peripheral top surface suitable to hold the outwardly projecting supporting flange 12 on the charge bucket 7 and prevent the escape of gases. Thus, with the fixed flanged member 35, it is not necessary to have the peripheral rib members, such as 19 on the sections 5, to form the supporting shelf for the charge bucket 7. The upwardly projecting flange 36 is preferably tapered or sloped outwardly from its lower inner periphery so that the lower edge of the bucket 7 is guided and centered over the swinging closure sections 5'. The sections 5' with their respective counterweight arms 13' which extend through slots in the member 35, follow the charge bucket downwardly and upwardly to allow the charge material to be introduced into the cupola, as described in connection with Figure 1 of the drawing, with very little loss of gas from the cupola. But, in this embodiment, the top of the sections 5' are below the flange member 35 and the contact between the bottom of the latter and the top surfaces of 5' provide a stop for the sections. This contacting holds the sections 5' in a normally horizontal position so that the spring members 15, as used in connection with the first described construction, are unnecessary. It should, however, be pointed out that the closure sections 5' cannot be swung upwardly to permit their action as an explosion door. Thus, in this embodiment of Figure 3, one or more openings 37, and top hinged explosion doors 38 are provided at the top end of the cupola, so that gas puffs and explosions can be relieved without damage to the charging equipment or to the cleaning and purifying apparatus which connects with the gas outlet duct 4.

As noted hereinbefore, as a particular feature of the invention, the present improved apparatus cooperates to provide means for introducing a portion of the charge material into the center portion of the cupola or uniformly across the cross-sectional area thereof. When this method of loading is desired, a portion of the charge material is either manually or automatically placed or dumped into the central portion of the top closure, such as the area bounded by the vertical ribs 17. Thus, when the loading bucket 7 pushes downwardly through the top closure, causing each of the sections 5 to swing downwardly and inwardly, that portion of the charge which is deposited on the closure sections 5 is permitted to fall and dump downwardly into the cupola itself and onto the material bed maintained therein. The loading bucket 7 subsequently continues its downward movement till it comes to rest, and the cone bottom is further dropped and the rest of the charge material is dumped peripherally into the interior of the cupola as hereinbefore described.

In Figures 4 and 5 of the drawing, there is indicated a specially constructed loading bucket, particularly in connection with the lower cone bottom portion thereof, such that the cooperation of this portion with the upper ribs of the closure sections 5 at the top of the cupola provide for the automatic loading of a specific portion of the charge material onto the top of the closure sections 5. The loading bucket is shown in section in each of the views and may have an outer body portion 22 which is similar to that of the bucket 7 in Figure 1 of the drawing, and suitable to hold charge material 23. Thus, where the improved method of loading and the construction and arrangement is utilized in connection with an iron foundry cupola, this material 23 normally comprises pig iron, or scrap iron, and coke. A drop bottom cone 24 connects with a specially enlarged supporting stem 25. The latter is hollow and is adapted to receive the limestone, or other specific portion of the charge material that is to be loaded in a lower section or compartment within the interior of the drop cone bottom 24. This interior compartment or reservoir section is formed by a fixed circular wall or baffle member 26, a suspended lower cone 27, and by a lower sliding wall section 28. The small cone bottom section 27 is preferably pivotally supported and vertically adjustable, such as provided by threaded member 29, which in turn hangs from a rod 30 or other means connecting across the wall 26. The sliding wall 28 is in turn supported at its lower edge on the cone member 27 and has an outwardly projecting flange member 31 that is adapted to come into contact with the various ribs 17 extending upwardly from each of the closure sections 5.

The advantage of this arrangement is that the additional charge material 32 may be loaded at the ground level when the charging bucket is being loaded with the charge material 23. For example, as noted hereinbefore, in loading an iron foundry cupola, it is desirable to utilize limestone flux and to substantially uniformly distribute this flux material across the entire cross-sectional area of the cupola, while the main charge material comprising the pig iron and coke 23 is preferably distributed peripherally around the bed of material maintained in the cupola, so that the usual soft core arrangement is maintained. The weight of the sliding wall section 28 together with the weight of the outwardly projecting flange 31 and suitable reinforcing rib members 33, provides a normally closed reservoir section for the charge material 32, with sliding wall member 28 resting on the edge of cone member 27. However, as is better illustrated in Figure 5 of the drawing, when the loading bucket is brought into position over the top of the cupola and is lowered till it contacts the top closure members 5, there is a first initial contact between the ribs 17 and the lower edge of the outwardly projecting flange member 31 on the sliding wall section. Thus, the wall section 28 is raised and slides upwardly around the wall portion 26 providing a free space there below and above cone member 27, for the charge material 32 to in turn flow downwardly onto the top surface of the abutting closure members 5, primarily between the rib members 17. Then, as the flange 34 at the lower edge of cone 24 comes into contact with the ribs 18 on the top of the closure sections 5, the latter are forced downwardly around the pivoting means 6, so that the charge material 32 is gradually allowed to spill or dump into the interior of the cupola 1 as the closure sections 5 swing back against the wall, permitting the material to be spread substantially evenly and uniformly across the entire area of the bed maintained within the cupola. The remaining portion of the charge material 23 is of course distributed in substantially the same manner as that described in connection with Figure 1 of the drawing. The loading bucket continuing its downward movement through the closure members 5 until such time as the upper edge of the loading bucket comes into contact with and is supported from the ribs 19, and the drop cone bottom 24 may be lowered still further to permit the downward peripheral discharge of the material 23 into the cupola.

Of course it is within the scope of the present invention that minor modifications may be made in various minor details in connection with the construction and arrangement of the loading means. For example, somewhat different types of counter-weighting arms may be provided or a different shape spring support means may be utilized to maintain the proper positioning of the closure sections 5 in connection with an embodiment permitting an explosion door action. However, in all instances the present construction and arrangement permits the closure sections to operate directly responsive to the movement of the charge bucket, while at the same time providing a closure which precludes the entrance of air into the cupola and permits the confined withdrawal of the gases and entrained particles from the top of the cupola so that they may be passed to suitable purifying equipment, not shown in connection with the present application. Thus, as noted, the purifying equipment can be designed to accommodate lesser quantities of gases at lower temperature than heretofore possible. The present method of operation further permits the mechanical loading of the cupola while preventing the escape of very little if any gases and entrained material from the top of the cupola. Still further, the special design and arrangement of a modified loading or charge bucket cooperates with the rib portions of the closure members of the cupola to in turn provide for the automatic loading of a specific portion of the charge material onto the top of the closure, and the subsequent substantially uniform distribution of this special portion of material into the cupola proper, prior to the discharge of any of the main portion of the charge material.

I claim as my invention:

1. Apparatus for effecting the top loading of a cupola and substantially preventing the escape of combustion gases therefrom while receiving charge material, which comprises in combination, a movable top closure on said cupola having a plurality of inwardly swinging and counterbalanced segmental sections, each of said sections hinged at the top edge of said cupola in a position to closely abut adjacent sections when in a normally horizontal closed relationship and each having counterweight means connecting to and extending therefrom, an open-ended charging bucket having a movable drop bottom and an outwardly projecting flange around the upper periphery thereof, means for lifting and lowering said bucket through the top end of said cupola whereby the lower end of said bucket may push the sections of said closure downwardly and enter said cupola, bucket supporting means extending around the periphery of said movable top closure adapted to hold said outwardly projecting flange of said charging bucket in a lowered position while substantially precluding the escape of gases from said cupola, and said means for lifting and lowering said bucket connecting with said movable drop bottom thereof in a manner permitting the bottom to drop from the lower end of said bucket and spill charge material into said cupola.

2. Apparatus for effecting the top loading of a cupola and substantially preventing the escape of combustion gases therefrom while receiving the charge material, which comprises, in combination, a movable top closure on said cupola having a plurality of inwardly swinging and counterbalanced segmental sections, each of said sections hinged to the top edge of said cupola and movably positioned in a normally horizontal closely abutting relationship, each section having a peripheral rib projecting substantially normal to the upper surface thereof, an open-ended charging bucket having a movable drop bottom and an outwardly projecting flange around the upper periphery thereof, means for lifting and lowering said bucket through the top end of said cupola whereby the lower end of said bucket may push said segmental sections of said closure downwardly and enter said cupola and said projecting flange of said bucket contacts and rests on resulting supporting flange means formed by rotating said peripheral ribs of said segmental sections of said top closure, and said means for lifting and lowering said bucket connects with said movable drop bottom thereof in a manner permitting the bottom to drop from the lower end of said bucket and spill charge material into said cupola.

3. The apparatus of claim 2 further characterized in that coiled spring means connect with the upper end of said cupola, and said spring means are positioned to contact with each of said counterbalanced segmental sections and hold each of the latter in a normally horizontal position abutting one another across the top of said cupola.

4. The apparatus of claim 2 further characterized in that each of said counterbalanced segmental sections has an intermediate transverse rib projecting substantially vertically from the upper surface thereof suitable to form a wall adapted for receiving a portion of said charge material from said charge bucket and to provide points of contact with a lower portion of said charging bucket.

5. The apparatus of claim 2 further characterized in that an upwardly projecting longitudinal rib extends substantially radially on each of said segmental sections of said top closure, and each of said longitudinal ribs has a sloping and curved vertical profile providing a longitudinal surface adapted for contacting the lower outer edge of said charge bucket as said sections follow said bucket downwardly and upwardly during the course of the loading operation.

6. The apparatus of claim 2 further characterized in that each of said segmental sections has an intermediate transverse rib projecting substantially vertically from the upper surface thereof and the plurality of resulting adjacent ribs forming a wall adapted to receive a portion of the charge material from said charge bucket, and below the center portion of said moveable drop bottom of said charging bucket a depending fixed wall section forming an upper wall portion for a center compartment suitable for a divided portion of the charge material, a suspended bottom section spaced below said compartment, a slideable lower wall section engaging in a sliding fit with said fixed depending wall section and adapted to rest on said bottom section, and said slideable lower wall section having outwardly projecting means adapted to contact with said intermediate transverse ribs projecting upwardly from the surface of said closure sections whereby the lifting of said lower wall section releases charge material from said center compartment.

7. The apparatus of claim 6 still further characterized in that said suspended bottom section of said center compartment is cone shaped and is vertically adjustable with respect to the lower periphery of said fixed wall section.

References Cited in the file of this patent

UNITED STATES PATENTS

| Number | Name | Date |
|---|---|---|
| Re. 5,397 | Harris | May 6, 1873 |
| 94,475 | McClure | Sept. 7, 1869 |
| 413,236 | Ludlow | Oct. 22, 1889 |
| 501,188 | Iles | July 11, 1893 |